United States Patent [19]

Jai

[11] 4,228,725
[45] Oct. 21, 1980

[54] ROTARY PISTON

[76] Inventor: Kenneth Jai, 3425 Durwood Dr., Beaumont, Tex. 77704

[21] Appl. No.: 915,159

[22] Filed: Jun. 13, 1978

[51] Int. Cl.³ .............................. F16J 1/02; F16J 1/08
[52] U.S. Cl. ...................................... 92/159; 92/248; 92/258
[58] Field of Search ................ 92/258, 248, 159, 182; 15/104.1 R; 277/DIG. 6, 173

[56] References Cited

U.S. PATENT DOCUMENTS

| | | | |
|---|---|---|---|
| 1,475,989 | 12/1923 | Easterday | 91/279 X |
| 2,092,087 | 9/1937 | Saharoff | 92/258 X |
| 2,557,497 | 6/1951 | Carney | 92/258 X |
| 2,803,842 | 8/1957 | Fuller | 15/304 X |
| 3,418,888 | 12/1968 | Mercier | 92/258X |
| 3,491,654 | 1/1970 | Zurcher | 92/258 X |
| 3,824,646 | 7/1974 | Jai | 15/104.1 R |
| 3,901,132 | 8/1975 | Jai | 92/182 |
| 3,939,903 | 2/1976 | Sakaki et al. | 277/DIG. 6 |
| 4,015,304 | 4/1977 | Dillinger | 15/104.1 R |

FOREIGN PATENT DOCUMENTS 361882  6/1962 Switzerland ................................ 92/248

*Primary Examiner*—Irwin C. Cohen
*Attorney, Agent, or Firm*—Edward D. O'Brian

[57] ABSTRACT

A piston for use with a rotary piston rod or so-called rotary piston can be constructed so as to utilize a solid sleeve-like piston body of a material selected from the group consisting of structural carbon and graphite. This piston body is utilized around an elongated, tubular center member which has openings extending to the interior of the piston body for the purpose of conveying hydraulic fluid so as to lubricate the piston body to facilitate relative rotation of the piston body relative to the sleeve. Appropriate grooves holding elastomeric fluorocarbon sealing rings are located in the piston body and holding structures are provided for holding the piston on the sleeve. The piston is particularly adapted for use in machines for use for cleaning tubes and pipes.

1 Claim, 1 Drawing Figure

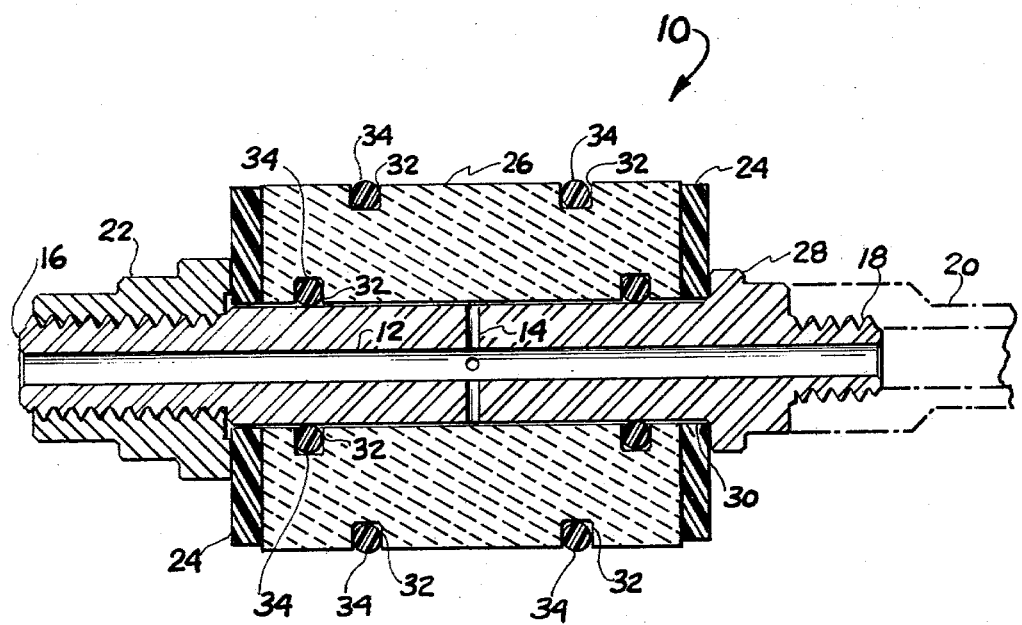

ROTARY PISTON

BACKGROUND OF THE INVENTION

The invention set forth in this specification pertains to new and improved rotary pistons. These pistons are constructed for use with rotary piston rods such as are employed in connection with various machines for cleaning tubes and pipes in chemical process and other related industries.

Such machines are normally constructed so as to include an elongated cylinder holding a piston in such a manner that a non-round piston rod rotatably connected to the piston can be moved axially with respect to the cylinder out through a rotary seal at one end of the cylinder. A conventional motor and mechanical coupling is normally employed in such a machine in order to rotate the piston rod as the piston is moved internally within the cylinder so as to both rotate and reciprocate a cutting or cleaning tool mounted on the end of the rod remote from the cylinder. A cutting or cleaning tool is moved in this manner within the interior of a tube or pipe so as to remove various types of deposits and accumulations from the interior of such a tube or pipe.

Many of such accumulations or deposits are of an extremely hard, tenacious character. As a consequence of this it is frequently quite difficult to break up or dislodge such deposits or accumulations during the use of a machine as indicated in the preceding discussion. The effective removal of such hard, tenacious deposits requires that comparatively large forces be applied to the piston in a machine as indicated in order to move the cleaning or cutting tool along a linear path. The removal of such deposits also requires the use of comparatively large amounts of power in rotating the piston rod employed. Such comparatively high amounts of power can, of course, be achieved in various different manners.

The most obvious of these would be to construct machines as indicated in the preceding discussion in a comparatively large, massive manner. This is considered to be disadvantageous because such machines have to be moved from one location to another in cleaning various different tubes and pipes. As a consequence of such movement such machines should be as small and light in weight as reasonably possible. In order to achieve this combination of light weight in a machine which is capable of removing comparatively hard, tenacious deposits such machines have been constructed so that the pistons in them have been operated by comparatively high pressure hydraulic fluids such as fluids in the pressure range of about 4,000 to 5,000 psi pressure.

The use of such comparatively high pressure hydraulic fluid in machines for cleaning tubes and pipes has proved somewhat disadvantageous for a rather unexpected reason. The pistons used in such machines have tended to wear out or fail after comparatively short periods, presumably because of the high pressures involved but in addition probably because of the comparatively high temperatures encountered or developed as a result of the use of such pistons when hydraulic fluids at such pressures are applied to such pistons. It is considered that a significant part of the temperature buildup tending to affect piston life is the result of the rotation of the piston rod used in connection with such a piston.

SUMMARY OF THE INVENTION

As a result of these considerations it is considered obvious that there has been a need for new and improved rotary pistons—i.e., pistons for use with rotary piston rods—which are capable of being utilized in comparatively high pressure systems for prolonged periods without piston failure. A broad objective of this invention is to fulfill this need. Further objectives of this invention are to provide pistons as noted which are comparatively simple, which can be easily and conveniently manufactured, and which are extremely effective for their intended utilization.

In accordance with this invention these objectives are achieved by providing a rotary piston having an elongated cylindrical, tubular center member, a piston body having a cylindrical interior fitting around the exterior of said center member between the ends of said center member, and holding means mounted on the ends of said center member for retaining said piston body intermediate the ends of said center member against longitudinal movement in which the improvement comprises: said piston body comprising a solid, cylindrical body of a material selected from the group consisting of structural carbon and graphite, said piston body including groove means for holding sealing rings located on its interior and on its exterior and an elastomeric, fluorocarbon sealing ring located within each of said groove means.

BRIEF DESCRIPTION OF THE DRAWING

Because of the nature of this invention it is considered that it is best explained with reference to the accompanying drawing in which:

The FIGURE is a cross-sectional view showing a presently preferred embodiment of a rotary piston in accordance with this invention.

It is not to be assumed that the invention is limited to a rotary piston having the precise number of grooves and/or the precise shape or relative proportions of the piston illustrated. The particular piston shown is constructed so as to utilize the principles or concepts of this invention set forth and defined in the appended claims. These principles or concepts can be utilized in other pistons which differ from the piston illustrated as to matters of routine design skill.

DETAILED DESCRIPTION

In the drawing there is shown a rotary piston 10 in accordance with this invention which is constructed so as to include an elongated, tubular center member 12 formed out of a conventional material such as steel so as to include at least some holes 14 leading through this member 12 intermediate its ends 16 and 18. The end 18 is threaded and is adapted to be secured to a non-round piston rod 20 as shown by dotted lines in the drawing. The other end 16 is also threaded and is adapted to hold an internally threaded collar 22 so as to position an assembly (not separately numbered) consisting of two identical enlarged washers 24 and a piston body 26 against another collar 28 located on the member 12 adjacent to the end 18. This collar 28 is secured in a conventional manner directly to the member 12 and if desired can be formed integrally with this member 12. The washers 24 and the piston body 26 are held relatively loosely by the threaded collar 22 so as to permit rotation around the center member 12.

Both the piston body 26 and the washers 24 are provided with cylindrical interiors 30 which are just slightly larger than the external diameter of the member 12. Various grooves 32 are provided in the body 26 for the purpose of holding elastomeric seals 34 so that these seals 34 are capable of forming fluid type contact with the interior of a cylinder (not shown) and with the exterior (not separately numbered) of the member 12. It is considered that a critical aspect of the invention involves the materials which are utilized in constructing the piston body 26 so that it is shaped as indicated in the preceding and in the materials used in connection with the seal 34.

Preferably the piston body 26 is shaped as a hollow cylinder as indicated and is constructed of a material selected from the group consisting of structural carbon and graphite. Structural carbon and graphite are well known materials of construction utilized in a wide variety of diverse ways in various different fields. Since these materials are well known and are described in many different references it is not considered necessary to specifically describe them in this specification. However, in order to avoid any question as to the nature of the materials designated herein reference is made to the text *Chemical Engineer's Handbook* edited by Perry, 3rd Edition, copyright 1950, published by the McGraw-Hill Book Company, New York, N.Y. On page 1550 of this text there is set forth a Table 9 entitled "Structural Carbon and Graphite" designating materials as can be utilized in constructing the piston body 26. This entire Table is incorporated herein by reference. Various manufacturers of impervious structural carbon and graphite as can be utilized in accordance with this invention are listed on page 1534 of the noted text.

The elastomeric seals 34 employed with the invention should be of such a character as to withstand comparatively high temperatures and pressures. It is considered that only various known elastomeric fluorocarbon sealing rings are effectively useable with the present invention. Such sealing rings are manufactured by a number of different manufacturers. Particularly desirable sealing rings for use with the invention are sold by the E. I. du Pont Company of Wilmington, Del., under the trade name "VITON".

In order to facilitate rotation and minimize wear caused by the collars 22 and 28 and the piston body 26 it is preferred to utilize as the washers 24 washers which are formed of a material which when reinforced will be reasonably capable of withstanding the pressures to be applied to the piston 10 and which are of a material having comparatively low friction characteristics. It is considered that effective results can be achieved in utilizing washers 24 which are of an injection molded grade of nylon such as Nylon 10 or various other related nylons. In order that these washers 24 should have desirable physical properties enabling them to hold up during use it is considered preferable for them to be annealed in accordance with conventional practice.

I claim:

1. A rotary piston having an elongated, cylindrical, tubular center member, a piston body having a cylindrical interior fitting around the exterior of said center member between the ends of said center member, and holding means mounted on the ends of said center member for retaining said piston body intermediate the ends of said center member against longitudinal movement, hole means leading from the interior of said center member to the interior of said piston in which the improvement comprises:

said piston body comprising a solid, cylindrical body of a material selected from the group consisting of structural carbon and graphite, said piston body including groove means for holding sealing rings located on its interior and on its exterior, and an elastomeric, fluorocarbon sealing ring located within each of said groove means, nylon washer means located at each of the ends of said piston body between said piston body and said holding means, and said piston body and said washer means fitting relative to said center member and said holding means so as to be rotatable about said center member and with respect to said holding means.

* * * * *